(12) United States Patent
Rantalainen

(10) Patent No.: US 10,033,959 B2
(45) Date of Patent: Jul. 24, 2018

(54) METHOD AND APPARATUS FOR IMAGE CONTENT DETECTION AND IMAGE CONTENT REPLACEMENT SYSTEM

(71) Applicant: Supponor Oy, Ristiina (FI)

(72) Inventor: Erkki Rantalainen, Ristiina (FI)

(73) Assignee: Supponor Oy, Ristiina (FI)

( * ) Notice: Subject to any disclaimer, the term of this patent is extended or adjusted under 35 U.S.C. 154(b) by 36 days.

(21) Appl. No.: 14/382,834

(22) PCT Filed: Mar. 7, 2013

(86) PCT No.: PCT/EP2013/054661
§ 371 (c)(1),
(2) Date: Sep. 4, 2014

(87) PCT Pub. No.: WO2013/132032
PCT Pub. Date: Sep. 12, 2013

(65) Prior Publication Data
US 2015/0015743 A1  Jan. 15, 2015

(30) Foreign Application Priority Data

Mar. 8, 2012  (GB) .................................. 1204129.9

(51) Int. Cl.
*H04N 5/225* (2006.01)
*H04N 5/72* (2006.01)
(Continued)

(52) U.S. Cl.
CPC .............. *H04N 5/72* (2013.01); *H04N 5/2258* (2013.01); *H04N 5/2621* (2013.01);
(Continued)

(58) Field of Classification Search
CPC .... H04N 5/2258; H04N 5/332; H04N 5/2723; H04N 5/72; H04N 5/2621; H04N 5/272;
(Continued)

(56) References Cited

U.S. PATENT DOCUMENTS

| 5,940,139 | A   | * | 8/1999  | Smoot ................ | H04N 5/272  |
|           |     |   |         |                       | 348/584     |
| 7,617,022 | B1  | * | 11/2009 | Wood ................. | G02B 27/01  |
|           |     |   |         |                       | 340/447     |
| 2003/0001954 | A1 | * | 1/2003  | Rantalainen ........ | H04N 5/262  |
|           |     |   |         |                       | 348/136     |
| 2004/0125992 | A1 | * | 7/2004  | Aoki ................. | G06K 9/00228 |
|           |     |   |         |                       | 382/118     |
| 2012/0139956 | A1 | * | 6/2012  | Joseph ............... | G09F 9/30   |
|           |     |   |         |                       | 345/690     |

FOREIGN PATENT DOCUMENTS

| DE | 19900366 A | 9/1999 |
| EP | 2387231 A2 | 11/2011 |

(Continued)

*Primary Examiner* — Twyler Haskins
*Assistant Examiner* — Carramah J Quiett
(74) *Attorney, Agent, or Firm* — Murphy, Bilak & Homiller, PLLC

(57) ABSTRACT

A subject (10), such as a billboard, has a filtering film (15) to absorb electromagnetic radiation specifically in a first wavelength band. A detector (60) provides a first detector signal (61*a*) relating to the first wavelength band and a second detector signal (61*b*) relating to another, different, second wavelength band, respectively. Suitably, the subject (10) appears with high intensity in one band and with low intensity in the other. A content replacement unit (40) produces a mask signal (43) by identifying regions of contrast between the first and second detector signals (61*a*, 61*b*) as target areas (75). A content substitution unit (47) selectively replaces the target areas (75) with alternate image content (42) to generate modified video images (72). The system is useful, for example, to generate multiple live television broadcasts each having differing billboard advertisements.

19 Claims, 7 Drawing Sheets

(51) Int. Cl.
 *H04N 5/272* (2006.01)
 *H04N 5/33* (2006.01)
 *H04N 5/262* (2006.01)

(52) U.S. Cl.
 CPC ........... *H04N 5/272* (2013.01); *H04N 5/2723* (2013.01); *H04N 5/332* (2013.01)

(58) Field of Classification Search
 CPC ................ H04N 7/18; G06K 9/00771; G06K 2009/00738; G06K 9/00711; G06K 9/00718; G06K 9/3241; G06F 3/04842; G01S 17/66
 See application file for complete search history.

(56) References Cited

FOREIGN PATENT DOCUMENTS

| | | | |
|---|---|---|---|
| GB | 2432706 | A | 5/2007 |
| GB | 2502986 | A | 12/2013 |
| JP | 2007163367 | A | 6/2007 |
| WO | 0158147 | A1 | 8/2001 |
| WO | 2006011706 | A1 | 2/2006 |
| WO | 2009074710 | A1 | 6/2009 |
| WO | 2009118184 | A1 | 10/2009 |
| WO | 2010049578 | A1 | 5/2010 |
| WO | 2012143596 | A1 | 10/2012 |

\* cited by examiner

METHOD AND APPARATUS FOR IMAGE CONTENT DETECTION AND IMAGE CONTENT REPLACEMENT SYSTEM

BACKGROUND

Field

The present invention relates in general to a system for manipulating the content of an image. More particularly, the present invention relates to a method and apparatus which detects a target area in one or more regions of an image, and which replaces the target area with alternate content. In some examples, the present invention relates to a dynamic image content replacement method and apparatus suitable for use with live television broadcasts.

Related Art

In the related art, one or more target areas within a video image are defined and then replaced with alternate images appropriate to specific viewer groups or geographical regions. For example, billboards at a ground or arena of a major sporting event are observed as part of a television broadcast, and these target areas are electronically substituted by alternate images that are more appropriate for a particular country or region. In particular, such a system is useful to create multiple television feeds each having different electronically generated advertisement content which is tailored according to an intended audience.

WO2001/58147 (Rantalainen) describes a method for modifying television video images, wherein a billboard or other visible object is identified with non-visible electromagnetic radiation, such as infra-red light.

WO2009/074710 (Rantalainen) describes a further method for modifying television video images by determining a shared area where the intended target area is overlapped by added graphics (e.g. graphics overlays) with a predetermined graphics percentage of coverage and substitute content is added according to the residual percentage of coverage not covered by the added graphics.

WO2012/143,596 (Suontama) describes a method of detecting which graphics elements, if any, have been added at any given time in frames of a video signal.

Considering the related art, there is still a difficulty in providing a reliable and effective mechanism for detecting a target area within a video image where content is to be replaced. In particular, there is still a difficulty in accurately and efficiently defining the target areas of the images which are to be replaced.

It is now desired to provide an apparatus and method which addresses these, or other, limitations of the current art, as will be appreciated from the discussion and description herein.

SUMMARY

According to the present invention there is provided a system, apparatus and method as set forth in the appended claims. Other features of the invention will be apparent from the dependent claims, and the description which follows.

In one example there is provided an improved mechanism for detecting a subject within video images, by using a two-channel detector system which applies narrow-band filtering on the subject relevant to only one of the two channels. As a result, the detector system achieves greater contrast between the two detected channels and is more accurate when picking out a target area corresponding to the subject from the surrounding area.

In one example system, a subject, such as a billboard, has a filter to absorb electromagnetic radiation specifically in a first wavelength band. A detector provides a first detector signal relating to the first wavelength band and a second detector signal relating to another, different, second wavelength band, respectively. Suitably, the subject appears with high intensity in the detector signal of one band and with low intensity in the other. The first and second bands may both be infra-red wavelength bands. A content replacement unit produces a mask signal by identifying regions of contrast between the first and second detector signals. The mask signal may thus identify target areas within video images of the subject. A content substitution unit selectively replaces the target areas with alternate image content. The system is useful to generate multiple live television broadcasts each having differing billboard advertisements.

In one example there is provided an image content manipulation system wherein a subject, such as a billboard, has a filter medium applied to a surface thereof. The filter suppresses electromagnetic radiation specifically in a first wavelength band. A camera observes the subject to provide video images of a scene. At least one detector unit also observes the scene to derive a first detector signal relating to the first wavelength band and a second detector signal relating to a different second wavelength band. A mask signal is accurately and efficiently identified by regions of high contrast between the first and second detector signals. A content replacement unit selectively replaces one or more target areas within the camera video images with alternate image content, such as displaying an alternate advertisement on the billboards.

In one example there is provided a billboard adapted to be used as the subject within the system discussed herein. The billboard may comprise a substrate and printed surface or printed sheet, such as for carrying a printed advertisement image. The billboard may comprise a filter medium to specifically filter the first wavelength band. The filter may be a filtering film applied to a surface of the billboard.

In one example, the billboard may be printed without using black ink. In one example, the billboard may be printed with cyan, magenta and yellow inks to form a CMY black. In one example, the billboard is printed so as to maintain absorption characteristics with respect to the first or second wavelength bands evenly across the printed surface of the billboard, even though different areas of the billboard may have different visible colours. In one example, the billboard substantially reflects infra-red spectrum wavelengths except for absorbing the first wavelength band by the filter.

In one example, the billboard may be passively illuminated by reflecting ambient radiation. In another example, the subject billboard may be actively illuminated with suitable radiation. In one example, the billboard comprises a plurality of light emitting units which illuminate the billboard with radiation. Suitably, the billboard is actively illuminated at least within the second wavelength band. In one example, the billboard may comprise one or more radiation emitting units which are arranged to emit radiation, such as infra-red light, to enhance the second wavelength band as detected by the second detector signal.

In one example, the billboard may comprise one or more compensating light emitting devices which are arranged to emit visible light of selected wavelengths, in particular to correct for colour defects or imbalances in the appearance of the subject. In one example, one or more light emitting units are provided together with a selective light filter layer which restricts an optical output of the light emitting units to a determined chromatic spectrum. In one example, these compensating light units are driven in use to emit light over selected wavelengths, such as blue or near-blue wavelengths, thus resulting in a chromatically compensated visible output from the subject billboard. In one example, the compensated visible output may be matched to a substantially flat (even) response characteristic across the visible chromatic spectrum.

In one example there is provided an image content detection apparatus. A camera image receiving unit receives camera video images observing a scene including a subject, such as a billboard, wherein the subject comprises a filter which absorbs a selected first wavelength band. A detector signal processing unit processes a plurality of detector signals relating to the scene including the subject. A first detector signal observes the scene in the first wavelength band. A second detector signal observes the scene in a different second wavelength band which is distinguishable from the first wavelength band. A mask signal generating unit generates and outputs a mask signal that defines areas of the images, e.g. a masking area or target area, corresponding to the subject according to regions of contrast between the first detector signal and the second detector signal.

In one example, the filter on the subject substantially transmits the second wavelength band or, conversely, does not absorb to a substantial degree radiation in the second wavelength band. In one example, the first wavelength band and the second wavelength band are mutually exclusive. In one example, the first wavelength band and the second wavelength band are separated by an inter-band gap so as to be readily distinguished by the detector signals. In one example, the first wavelength band and the second wavelength band both comprise non-visible wavelengths. In one example the first wavelength band is closer to visible wavelength band, comprising wavelengths longer or shorter as appropriate, than the second wavelength band. In one example, the first wavelength band and the second wavelength band are both infra-red wavelength bands.

In one example, the camera image receiving unit receives the camera images which observe the scene including both the subject and an intervening object which at least partially obscures the subject. In one example, the object does not specifically filter the first wavelength band and/or the second wavelength band. Suitably, the intervening object treats the first wavelength band and the second wavelength band equally without regard to either band. Meanwhile, the subject of interest substantially absorbs radiation in the first wavelength band but substantially reflects radiation in the second wavelength band. Thus, the system is better able to distinguish between the subject and any intervening obstacles, such as people, players or equipment.

In one example, the apparatus may further include a content substitution unit which substitutes the one or more marked target areas in the camera images with alternate content according to the mask signal, thereby to produce and output modified video images. In one example, the content substitution unit performs photo-realistic substitution. The marked areas of the received camera images relating to the subject are suitably replaced with the alternate content, thus allowing multiple different broadcast feeds appropriate to different audiences.

In one example, the detector signals may be derived from the video images captured by the camera, e.g. using visible or near-visible light radiation capable of being captured optically through the camera, such that the camera may also act as the detector unit. In another example embodiment, one or more detector units are provided separate to the camera or cameras.

In one example there is provided a method of detecting a subject in a video image. The method may include filtering radiation at the subject to absorb radiation in a selected first wavelength band, providing video images of a scene which includes the subject, producing a first detector signal observing the scene in the first wavelength band, producing a second detector signal observing the scene in a different second wavelength band, generating a mask signal that defines target areas of the video images corresponding to the subject according to areas of contrast between the first detector signal and the second detector signal, and outputting the mask signal.

In one example, the method may further include substituting the marked areas in the video images with alternate content according to the mask signal.

In one example there is provided a tangible non-transient computer readable medium having recorded thereon instructions which when executed cause a computer to perform the steps of any of the methods defined herein.

BRIEF DESCRIPTION OF THE DRAWINGS

For a better understanding of the invention, and to show how embodiments of the same may be carried into effect, reference will now be made, by way of example, to the accompanying diagrammatic drawings in which.

DETAILED DESCRIPTION

The example embodiments will be described with reference to a content replacement system, or more generally an apparatus and method for image content manipulation, which may be used to replace content within television video images and particularly to provide photo-realistic replacement of a billboard for live television broadcasts. However, the methods and apparatus described herein may be applied in many other specific implementations, which may involve other forms of video images or relate to other subjects of interest, as will be apparent to persons skilled in the art from the teachings herein.

Figure 1:
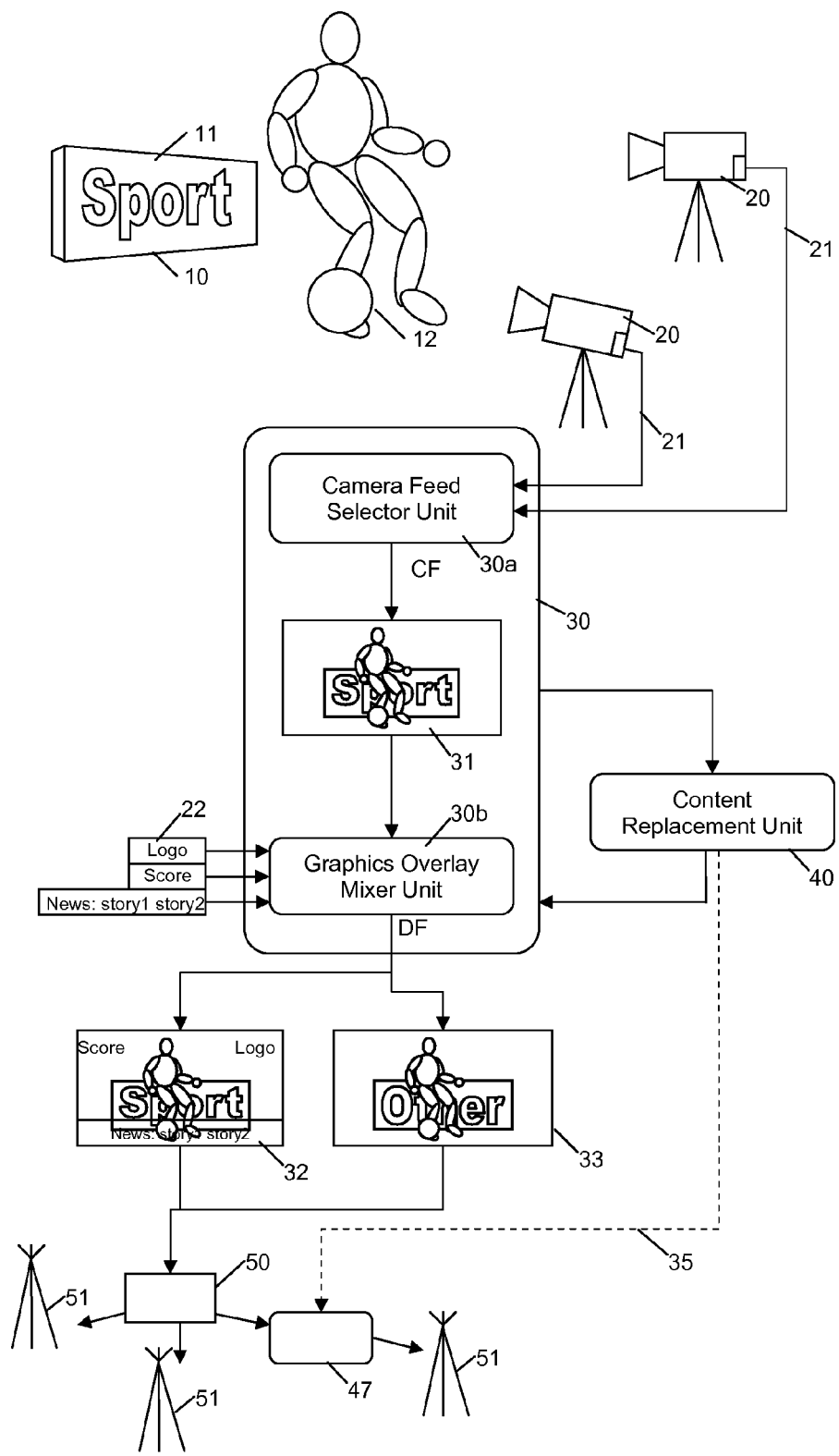
FIG. 1 is a schematic diagram of an example television broadcasting system incorporating an example content manipulation system as discussed herein.

FIG. 1 is a schematic overview of a television broadcasting system in which example embodiments may be applied. FIG. 1 includes one or more observed subjects 10, one or more cameras 20, a vision mixer 30, a content replacement unit 40, and a broadcast delivery system 50. It will be appreciated that the television broadcasting system of FIG.

1 has been simplified for ease of explanation and that many other specific configurations will be available to persons skilled in the art.

In the illustrated embodiment, the observed subject of interest is a billboard 10 which carries original content 11 such as an advertisement (in this case the word "Sport"). The billboard 10 and the original content 11 are provided to be seen by persons in the vicinity. For example, many billboards are provided at a sporting stadium or arena visible to spectators present at the event. In one example, the billboards 10 are provided around a perimeter of a pitch so as to be prominent to spectators in the ground and also in video coverage of the event.

A television camera 20 observes a scene in a desired field of view to provide a respective camera feed 21. The field of view may change over time in order to track a scene of interest. The camera 20 may have a fixed location or may be movable (e.g. on a trackway) or may be mobile (e.g. a hand-held camera or gyroscopic stabilised camera). The camera 20 may have a fixed lens or zoom lens, and may have local pan and/or tilt motion. Typically, several cameras 20 are provided to cover the event or scene from different viewpoints, producing a corresponding plurality of camera feeds 21.

The billboard 10 may become obscured in the field of view of the camera 20 by an intervening object, such as by a ball, person or player 12. Thus, the camera feed 21 obtained by the camera 20 will encounter different conditions at different times during a particular event, such as (a) the subject billboard moving into or out of the field of view, (b) showing only part of the subject (c) the subject being obscured, wholly or partially, by an obstacle and/or (d) the observed subject being both partially observed and partially obscured. Hence, there is a difficulty in accurately determining the position of the desired subject 10 within the relevant video images, and so define a masking area or target area where the content within the video images is to be enhanced or modified, such as by being electronically replaced with alternate image content.

As shown in FIG. 1, the captured camera feeds 21 are provided, whether directly or indirectly via other equipment, to a vision mixing system 30, which in this example includes a camera feed selector unit 30a and a graphics overlay mixer unit 30b. Typically, the vision mixer 30 is located in a professional television production environment such as a television studio, a cable broadcast facility, a commercial production facility, a remote truck or outside broadcast van ('OB van') or a linear video editing bay.

The vision mixer 30 is typically operated by a vision engineer to select amongst the camera feeds 21 at each point in time to produce a clean feed (CF) 31, also known as a director's cut clean feed. The vision mixing system 30 may incorporate or be coupled to a graphics generator unit (not shown) which provides a plurality of graphics layers 22 such as a station logo ("Logo"), a current score ("Score") and a pop-up or scrolling information bar ("News: story1 story2"). Typically, the one or more graphics layers 22 are applied over the clean feed 31 to produce a respective dirty feed (DF) 32.

A separate graphics computer system may produce the graphics layers 22, and/or the graphics layers 22 may be produced by components of the vision mixer 30. The graphics layers 22 may be semi-transparent and hence may overlap the observed billboard 10 in the video images. The graphics layers 22 may be dynamic, such as a moving logo, updating time or score information, or a moving information bar. Such dynamic graphics layers 22 give rise to further complexity in defining the desired masking area (target area) at each point in time.

The dirty feed 32 is output to be transmitted as a broadcast feed, e.g. using a downstream broadcast delivery system 50. The feed may be broadcast live and/or is recorded for transmission later. The feed may be subject to one or more further image processing stages, or further mixing stages, in order to generate the relevant broadcast feed, as will be familiar to those skilled in the art. The broadcast delivery system 50 may distribute and deliver the broadcast feed in any suitable form including, for example, terrestrial, cable, satellite or Internet delivery mechanisms to any suitable media playback device including, for example, televisions, computers or hand-held devices. The broadcast feed may be broadcast to multiple viewers simultaneously, or may be transmitted to users individually, e.g. as video on demand.

The content replacement unit 40 is arranged to identify relevant portions of video images corresponding to the observed subject of interest. That is, the content replacement unit 40 suitably performs a content detection function to identify target areas or regions within the relevant video images which correspond to the subject of interest. The content replacement unit 40 may optionally also suitably perform a content substitution function to selectively replace the identified portions with alternate content, to produce an alternate feed 33 which may then be broadcast as desired. In another example, the content substitution function may be performed later by a separate content substitution unit 47 (also called a 'remote adder'). In which case, an intermediate feed 35 may be carried between an upstream content detection unit 40 and the downstream remote adder unit 47, as will be explained in more detail below.

Figure 2:
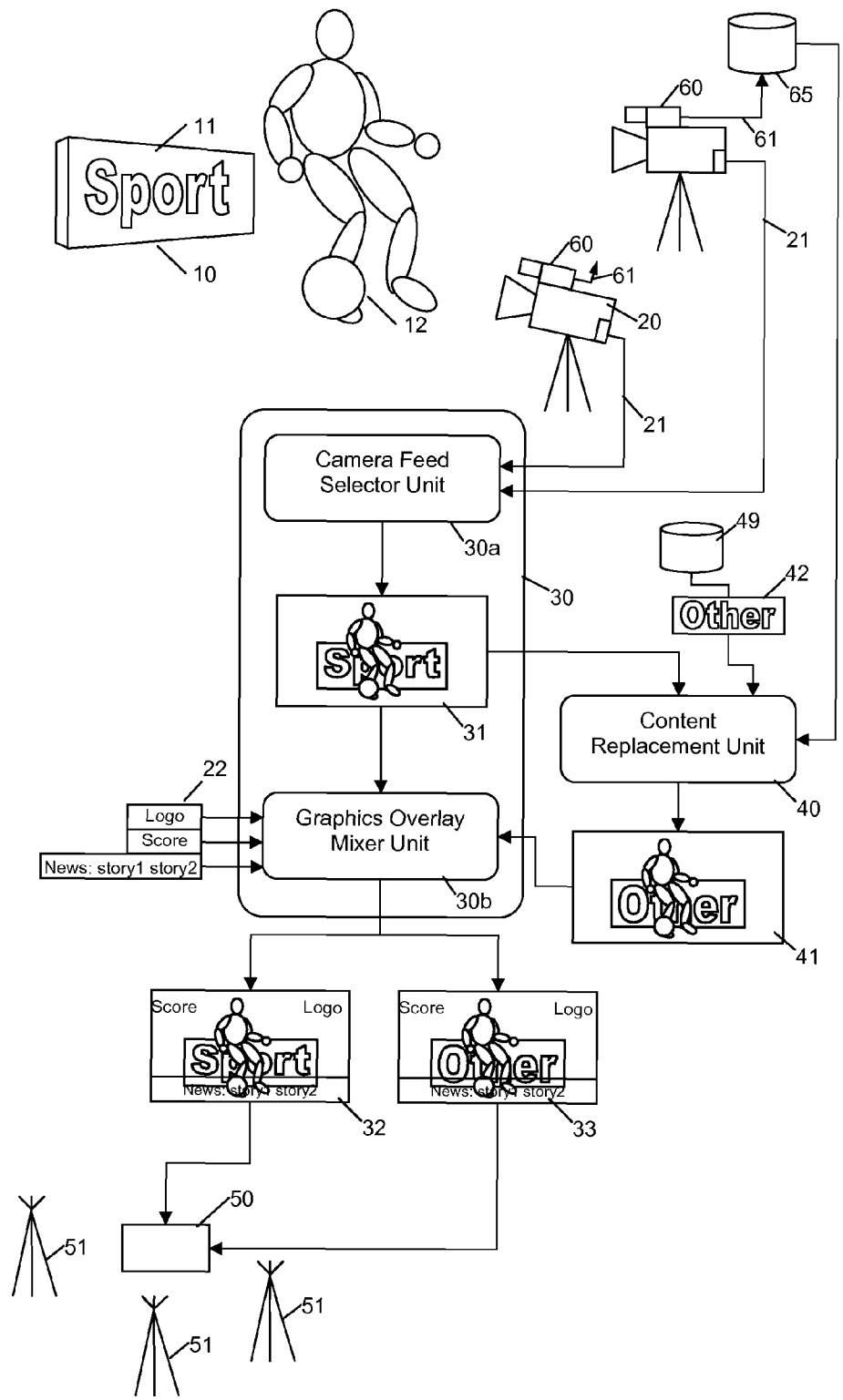
FIG. 2 is a further schematic diagram of the example system of FIG. 1.

FIG. 2 shows one example implementation of the television broadcasting system in more detail. In this case, the content replacement unit 40 receives a suitable video image feed, such as the clean feed 31, and identifies therein a target area relevant to the billboard 10 as the subject of interest. The received images 31 may then be modified so that the subject of interest 10 is replaced with alternate content 42, to produce amended output images 41. In this illustrative example, a billboard 10, which originally displayed the word "Sport", now appears to display instead the alternate content 42, as illustrated by the word "Other". In this example, the content replacement unit 40 is coupled to receive the incoming video images 31 from the vision mixer 30 and to return the amended video images 41 to the vision mixer 30.

In one example embodiment, the content replacement unit 40 may be provided in combination with the vision mixer 30. As one example, the content replacement unit 40 might be embodied as one or more software modules which execute using hardware of the vision mixer 30 or by using hardware associated therewith.

In another example embodiment, the content replacement unit 40 may be provided as a separate and stand-alone piece of equipment, which is suitably connected by appropriate wired or wireless communications channels to the other components of the system as discussed herein. In this case, the content replacement apparatus 40 may be provided in the immediate vicinity of the vision mixer 30, or may be located remotely. The content replacement apparatus 40 may receive video images directly from the vision mixer 30, or via one or more intermediate pieces of equipment. The input video images may be recorded and then processed by the content replacement apparatus 40 later, and/or the output images may be recorded and provided to other equipment later.

In the example embodiment of FIG. 2, the content replacement apparatus 40 receives the clean feed 31 directly from the vision mixer 30 and produces a modified clean feed 41 as output. The graphics layers 22 are then added to these modified video images 41 through the graphics overlay unit 30b to create at least one modified dirty feed 33 ready for broadcast.

Further background information regarding these example embodiments of the content replacement apparatus may be found, for example, in published patent applications WO2009/074710 (Rantalainen) and WO2012/143596 (Suontama) the entire content of which is incorporated herein by reference.

In the example embodiments, a high value is achieved when images of a sporting event, such as a football or soccer match, are shown live to a large audience. The audience may be geographically diverse, e.g. worldwide, and hence it is desirable to create multiple different alternate broadcast feeds 33 for supply to the broadcasting system 50 to be delivered in different territories using local delivery broadcast stations 51, e.g. country by country or region by region. In a live event, the content replacement apparatus 40 should operate reliably and efficiently, and should cause minimal delay.

In the example embodiments, the alternate content 42 comprises one or more still images (e.g. JPEG image files) and/or one or more moving images (e.g. MPEG motion picture files). As another example, the alternate content 42 may comprise three-dimensional objects in a 3D interchange format, such as COLLADA, Wavefront .OBJ or Autodesk .3DS file formats, as will be familiar to those skilled in the art.

The alternate content 42 is suitably prepared in advance and is recorded on a storage medium 49 coupled to the content replacement apparatus 40. Thus, the content replacement apparatus 40 produces one or more output feeds 41 where the observed subject 10, in this case the billboard 10, is replaced instead with the alternate content 42. Ideally, the images within the alternate feed 41 should appear photorealistic, in that the ordinary viewer normally would not notice that the subject 10 has been electronically modified. Hence, it is important to accurately determine a masking area defining the position of the billboard 10 within the video images input to the content replacement apparatus 40. Also, it is important to identify accurately when portions of the observed subject 10 have been obscured by an intervening object 12 such as a player, referee, etc. Notably, the intervening object or objects may be fast-moving and may appear at different distances between the camera 20 and the subject 10. Further, it is desirable to produce the alternate feed 41 containing the alternate content 42 in a way which is more agreeable for the viewer, and which is less noticeable or obtrusive. Thus, latency and synchronisation need to be considered, as well as accuracy of image content manipulation.

As shown in FIG. 2, the example content replacement apparatus 40 is arranged to process a plurality of detector signals 61. In one example embodiment, the detector signals 61 may be derived from the video images captured by the camera 20, e.g. using visible or near-visible light radiation capable of being captured optically through the camera 20, wherein the camera 20 acts as a detector 60. In another example embodiment, one or more detector units 60 are provided separate to the cameras 20.

The detector signals 61 may be derived from any suitable wavelength radiation. The wavelengths may be visible or non-visible. In the following example embodiment, the detector signals 61 are derived from infra-red wavelengths, and the detector signals 61 are infra-red video signals representing an infra-red scene image. Another example embodiment may detect ultra-violet radiation. In one example embodiment, polarised visible or non-visible radiation may be detected. A combination of different wavelength groups may be used, such as a first detector signal derived from any one of infra-red, visible or ultra-violet wavelengths and a second detector signal derived from any one of infra-red, visible or ultra-violet wavelengths.

In the illustrated example embodiment, one or more detectors 60 are associated with the camera 20. In the example embodiment, each camera 20 is co-located with at least one detector 60. The or each detector 60 may suitably survey a field of view which is at least partially consistent with the field of view of the camera 20 and so include the observed subject of interest 10. The detector field of view and the camera field of view may be correlated. Thus, the detector signals 61 are suitably correlated with the respective camera feed 21. In the example embodiment, the detector signals 61 are fed to the content replacement apparatus 40. In the example embodiment, the detector signals 61 are relayed live to the content replacement apparatus 40. In another example embodiment, the detector signals 61 may be recorded into a detector signal storage medium 65 to be replayed at the content replacement apparatus 40 at a later time.

Figure 3:
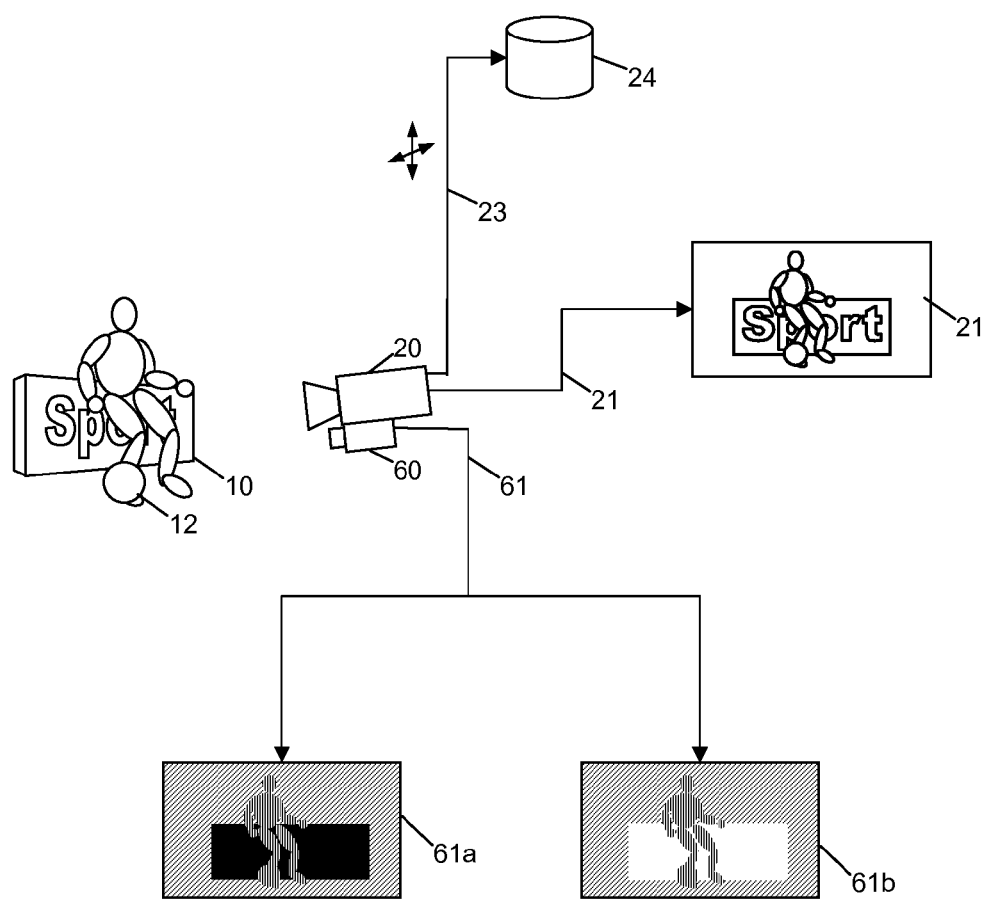
FIG. 3 is a schematic view of a detector unit as used in the example system.

FIG. 3 is a schematic view showing an example content manipulation system in more detail. In this example, the system uses infra-red detectors to determine a position of the subject (i.e. the billboards) within the video images.

In particular, FIG. 3 shows the camera 20 and the one or more detectors 60 in more detail. In this example, at least one infra-red detector 60 is associated with each of the cameras 20, producing one or more streams of detector signals 61a, 61b. As an example, the one or more detectors 60 may be narrow-spectrum near infra-red (NIR) cameras. The detector 60 may be mounted adjacent to the camera 20 so as to have a field of view consistent with the camera 20. Further, in some embodiments, the detectors 60 may optionally share one or more optical components with the camera 20.

The detector 60 may be arranged to move with the camera 20, e.g. to follow the same pan & tilt motions. In the example embodiments, the cameras 20 may provide a telemetry signal 23 which records relevant parameters of the camera, such as the focal length, aperture, motion and position. In one example, the telemetry signal 23 includes pan and tilt information. The telemetry 23 may also include zoom information or zoom information may be derived from analysing the moving images themselves. The telemetry 23 may be used, directly or indirectly, to calculate or otherwise provide pan, roll, tilt and zoom (PRTZ) information. The camera telemetry signal 23 may be passed to the content replacement apparatus 40, directly or via an intermediate storage device or recording medium 24, in order to provide additional information about the field of view being observed by the camera 20.

In the example embodiment, substantially the same field of view is observed by first and second detector signals 61a, 61b which are sensitive to at least two different and distinguishable wavelength ranges or wavelength bands. As will be discussed below, these multiple detector signals 61a, 61b improve detection of a desired masking area in the content replacement apparatus 40. The wavelength bands may take any suitable non-identical values. The observations in one band may be distinguished against observations with respect to the other band. In other words, the bands are separable to a significant extent. In the example embodiments, the bands are non-overlapping, but overlapping bands may be used in some cases. In the example embodiments, the bands may be separated by an unobserved range or inter-band gap which is not present in either wavelength band.

The one or more detectors 60 may be narrow-spectrum near infra-red (NIR) cameras. The detectors 60 may produce at least a first detector signal 61a which is sensitive to a first wavelength band, such as 780-810 nm, and a second detector signal 61b which is sensitive to a second wavelength band, such as 820-900 nm. The first wavelength band 61a may comprise wavelengths which are closer to the visible wavelength band than the second wavelength band 61b. In the case of infra-red, the first wavelength band 61a may comprise wavelengths which are shorter than the second wavelength band 61b.

Figure 4:
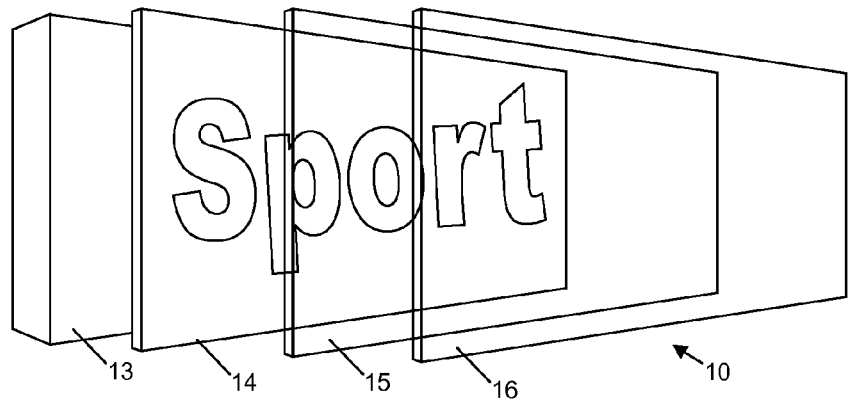
FIG. 4 is a perspective view of an example billboard as used in the example system.

FIG. 4 is a schematic view showing one example embodiment of the billboard 10 in more detail. In this example, the subject billboard 10 comprises a substrate 13 which carries a printed medium 14, such as a printed sheet, to display a desired printed message or advertisement. The billboard 10 may be passive, being illuminated by ambient radiation (e.g. from natural sunlight or stadium lights) and reflecting the ambient radiation toward the camera 20 and detector 60. Further, the billboard 10 may be arranged to actively radiate by including a plurality of radiation emitting units, such as light emitting diode (LED) packages.

In more detail, the billboard 10 suitably comprises a plurality of layers including a substrate 13, a printed sheet 14, a filter medium 15 and a transparent protective cover 16. The substrate 13 may take any suitable size, shape and form. In the example embodiment, the substrate 13 is substantially planar, rectangular, and has a degree of structural rigidity sufficient to maintain the physical integrity of the billboard 10 when in use. The printed sheet 14 may be relatively thin and flexible, e.g. paper. The billboard 10 may be arranged so that the printed sheet 14 is readily replaceable, so that displayed advertisement content can be easily changed. The cover 16 is suitably transparent and may protect the appearance of the billboard 10, and particularly the printed sheet 14, e.g. from wind, rain and the like.

In this example, the filter 15 is provided in the form of a filtering film. In the example embodiments, the filtering film 15 allows visible light wavelengths to pass without significant interference, whilst absorbing at least some non-visible wavelengths. Visible light is typically in the range 400 nm-720 nm, which the filtering film 15 passes substantially unhindered. By contrast, the filtering film 15 is suitably a narrow band filter with high absorption characteristics for a selected bandwidth of non-visible radiation. In one example, the filtering film comprises a near infra red dye, such as a fine organic compound comprising platinum and nickel.

In one example embodiment, the filtering film 15 may be adhered to, coated onto or integrated within the protective cover 16. In another example embodiment, the filtering film 15 is provided behind the printed sheet 14. In this case, the filtering film 15 may be adhered to, coated onto or integrated within the substrate 13 and/or on a rear surface of the printed sheet 14. Conveniently, the printed inks of the sheet 14 are selected to be substantially transparent to the detected wavelengths of interest for the detector signals 61. Meanwhile a reflective surface, e.g. the substrate 13 as a white background plate, may reflect across a broad spectrum of interest. Thus, the filtering film 15 may be hidden from view behind the printed sheet 14, which improves an aesthetic appearance of the billboard 10 while maintaining the desired functionality. In this example, the billboard 10 is passive, being illuminated by ambient light and reflecting the ambient radiation toward the camera 20 and detector 60.

Figure 5:
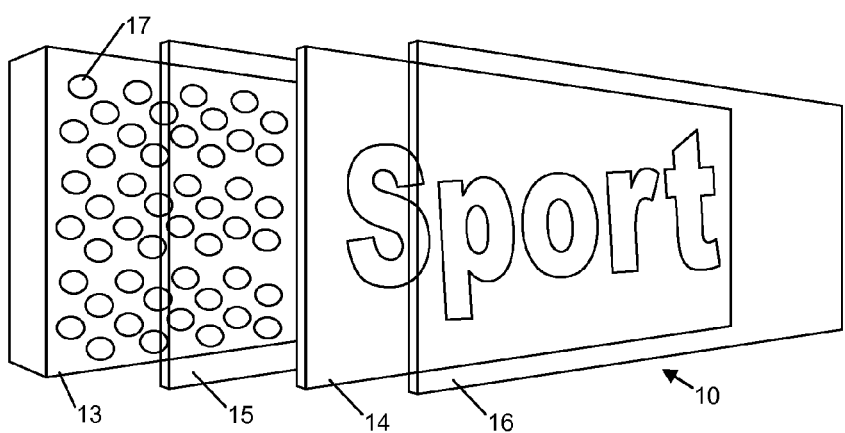
FIG. 5 is a perspective view of another example billboard.

FIG. 5 shows a further example of the billboard 10, which may be actively illuminated by including a plurality of light units 17, such as light emitting diode (LED) packages. A lens unit and/or a diffuser (not shown) may be provided to distribute light from the LED units 17 evenly across an illuminated area of the billboard. Thus, in the example embodiment, the light units 17 may form a light box to illuminate the printed sheet 14 from behind. In particular, the LED units 17 may be arranged to emit infra-red light to enhance the second wavelength band as detected by the second detector signal 61b, such as the range 820-900 nm as noted above.

Figure 6A:
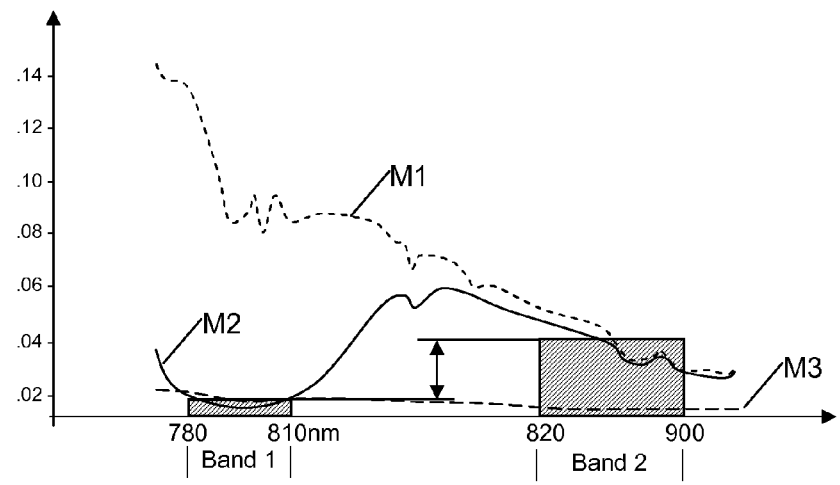
FIGS. 6A, 6B and 6C are graphs showing radiation spectra as may be observed in the example system.
Figure 6B:
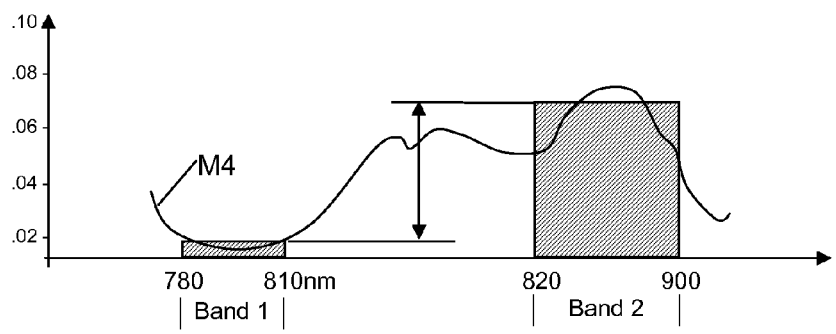

FIGS. 6A and 6B are graphs which show example radiation spectra as may be observed in the example content replacement system described herein.

FIG. 6A provides a comparison of an observed radiation spectrum with, and without, the filtering film 15, demonstrating relatively well-defined narrow band absorption over a first specific wavelength band in the near infra-red region (Band 1), while not significantly absorbing a second wavelength band (Band 2).

Firstly, a white measurement M1 is shown, for comparison, against an arbitrary intensity scale. In this case, the billboard 10 is observed with a plain white unprinted reflective surface by a broad-spectrum detector across non-visible infra-red wavelengths such as from 780 to 940 nm. This white measurement shows that the detected infra-red declines as wavelength increases, which can be explained by the natural spectrum of ambient infra-red light (e.g. from the sun and/or from stadium lights), or due to the declining sensitivity of the detector units 60 with increasing wavelength.

A filtered measurement M2 is also shown. In this case, the filtering film 15 demonstrates significant absorption in the short IR range of Band 1, while not significantly affecting the longer IR wavelengths of Band 2. As a result, the filtering film 15 causes the detector signals 61 to show the billboard 10 as a dark object in the first detector signal 61a relating to Band 1, but as a light object in the second detector signal 61b relating to Band 2. This enhanced contrast between the two detector signals 61a, 61b allows the area of the billboard 10 within the field of view to be detected with greater accuracy.

FIG. 6A further shows an observation M3 where the printed sheet 14 is prepared with black (K) ink as with a four-colour printing process (CMYK). In this case, the black ink K significantly absorbs infra-red wavelengths consistently across a wide frequency range, which would negate the observations by the detector 60. Thus, in the example embodiments, the printed sheet 14 is prepared using only coloured inks and without any K (black) ink. In the example embodiments, the printed sheet 14 is printed with a three-colour ink printing system using only CMY (cyan, magenta, yellow) printing inks as appropriate for printing large-scale advertising media. In which case, the response with the printed sheet 14 is substantially as shown in the observation M2.

A near-black may be achieved by printing only with C, M and Y, which is sufficient to maintain the desired visual appearance of the printed sheet 14 when viewing the billboard 10. However, it has been found that CMY printing allows the billboards 10 to be used more effectively with the content replacement apparatus 40 discussed herein. For example, the system achieves better performance in distinguishing between the subject billboard 10 and an intervening dark-coloured obstacle 12 which absorbs infra-red, such as a person wearing black clothing.

It has been found that absorbing the shorter wavelengths closer to the visible spectrum advantageously enhances a natural tendency for some materials used in construction of the billboard, and some printing inks or paints, to absorb in this wavelength band. Hence, deliberately absorbing the shorter band (Band 1), while making the longer band (Band 2) appear as bright as possible, reduces any negative impact of unintended absorbance in the shorter band (Band 1). It is surprising that the materials, paint and inks used to construct some of the example embodiments of the billboard actually do not absorb the longer band (Band 2) and thus show up as 'white' (high intensity) in the second detector signals 61*b*. Even so, it will be appreciated that the second wavelength band (Band 2) may suitably lie in the near infra red range and still relatively close to the visible spectrum. This allows many practical benefits, e.g. that lenses intended for optical use will also be applicable in this near infra-red region.

In a further alternative embodiment, the system may be configured with the longer wavelength band being absorbed, while the shorter wavelength band is not intentionally absorbed. In some practical circumstances, depending upon the materials selected for the billboard and the types of obstacles encountered, it may be preferable to intentionally absorb the longer wavelength band in this way. Again, it is surprising that such a configuration has been found beneficial.

The system may be configurable to operate in multiple modes, i.e. sometimes with subjects that absorb one (e.g. shorter) wavelength band and sometimes with subjects which absorb another (e.g. longer) wavelength band.

FIG. 6B illustrates a further measured spectrum M4 as may be observed in the case of the actively illuminated billboard 10 (e.g. as shown in FIG. 5). In this example, the LEDs 17 of the active billboard 10 may be chosen to emit infrared light specifically in the second wavelength band (Band 2), thus further enhancing contrast against the filtered first wavelength band (Band 1). Thus, it will be appreciated that actively emitting infra-red radiation from the subject of interest is advantageous in many practical circumstances.

Figure 6C:
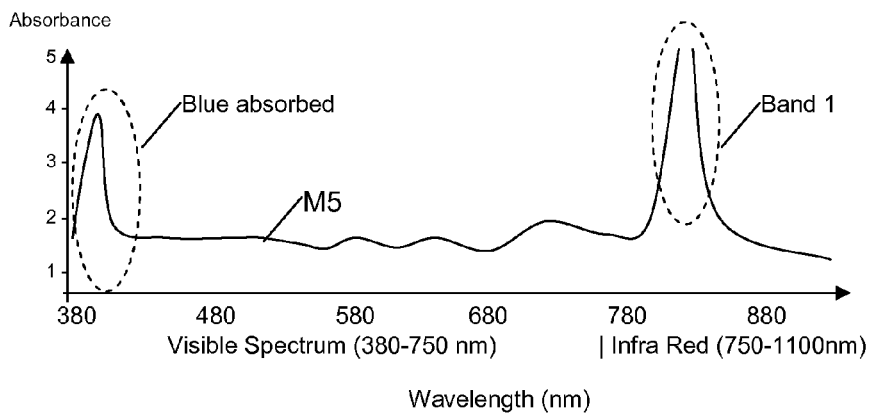

FIG. 6C is a graph which shows a further illustrative radiation spectrum M5 as may be observed in the example content replacement system described herein. The measured spectrum M5 which observes the subject 10 (billboard) across the visible light spectrum and into near infra-red. Here, it has been noted that areas of the printed sheet 14 which are intended to appear white may instead appear off-white, cream or near-yellow. It has been observed that there is a tendency for blue wavelengths (e.g. near 430 nm) to be absorbed by the construction of the billboard, and in particular due to some example embodiments of the filtering film 15.

In a further enhancement, the subject 10 (billboard) may be provided with one or more compensating light emitting devices which are arranged to emit light of selected wavelengths, in particular to correct for colour defects or imbalances in the appearance of the printed sheet 14. In one example, one or more of the LED units 17 as shown in FIG. 5 are provided together with a light filter layer which restricts the optical output to a desired chromatic spectrum. Thus, considering the measured spectrum M5 in FIG. 6C, these compensating light units 17 are in use driven to emit light over selected wavelengths (in this case near-blue) thus resulting in a compensated output which is nearer to a desired flat response.

In the example embodiments, the billboard 10 includes light emitting units 17 at least some of which are arranged to emit infra-red radiation in the second wavelength band as discussed above. Thus, the system has better performance for a television audience who see the alternate image content applied to the billboards. Further, at least some of the light emitting units 17 within the billboard 10 are arranged to provide chromatic compensation to enhance their visible appearance for spectators locally (and likewise for a local television audience who see the original images of the billboards).

Figure 7:
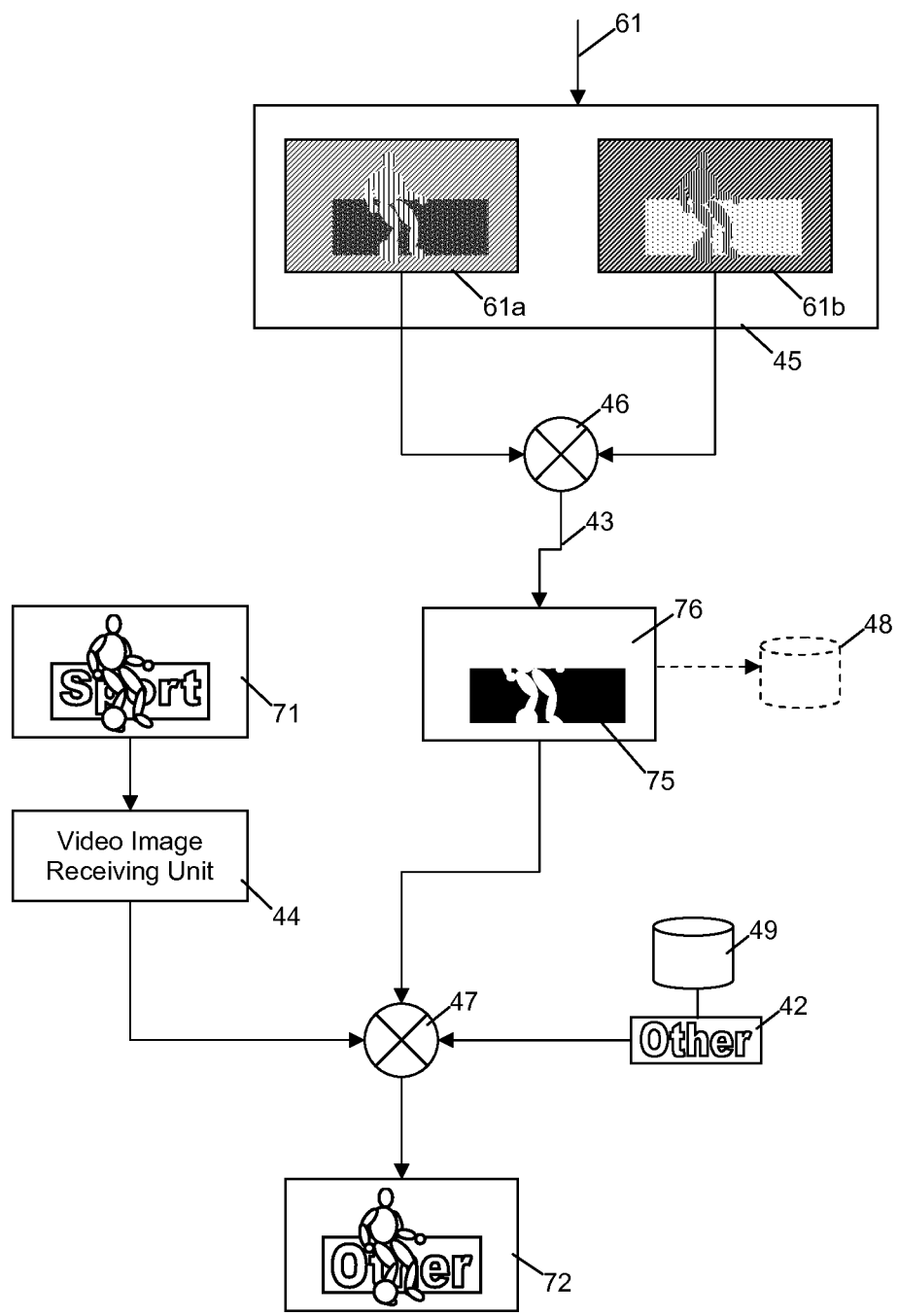
FIG. 7 is a schematic view showing an example content detection apparatus.

FIG. 7 is a schematic view showing the example content replacement apparatus in more detail. In the example embodiment, the content replacement apparatus 40 comprises a camera image receiving unit 44, a detector signal processing unit 45, a mask signal generating unit 46, and a content substitution unit 47.

The camera image receiving unit 44 receives any suitable video images 71. As described above, the camera feeds 21 may be multiplexed together to provide a clean feed 31 comprising moving images from different cameras 20 at different points in time. The clean feed 31 may be modified with additional graphics layers to produce a dirty feed 32. One or more of the camera image feed 21, the clean feed CF 31 and/or the dirty feed DF 32 discussed above, and/or other suitable video image signals, may be provided to the content replacement apparatus 40, depending upon the nature of the installation.

The detector signal processing unit 45 suitably receives input signals which allow the subject billboards 10 to be identified within the video images 71. In particular, the detector signal processing unit 45 may process the infra-red detector signals 61 and/or the camera telemetry signals 23 discussed above. As noted above, the one or more detector units 60 produce a pair of detector signals 61*a* and 61*b* according to respective first and second wavelength bands. It will be appreciated that the filtering film 15 applied to the billboard 10 absorbs wavelengths which are consistent with the first wavelength band of the first detector signal 61*a*, but not the second wavelength band of the second detector signal 61*b*. Hence, the first detector signal 61*a* represents the billboard 10 as being a relatively dark area, because infra-red radiation in the studied band has been absorbed by the filtering film 15. Meanwhile, the second detector signal 61*b* is relatively unaffected by the filtering film 15 and hence the subject billboard 10 appears as a relatively bright object.

The detector signals 61*a*, 61*b* relate to a scene or field of view including the subject billboard 10. The scene observed in the detector signals 61*a*, 61*b* is consistent with the scene in the camera images 21 from the camera 20. In the example embodiments, the detector signal processing unit 45 processes the detector signals 61*a*, 61*b*, particularly so that the detector signals 61*a*, 61*b* are correlated with each other and with the camera feed 21. Further, in the example embodiments, the first and second detector signals 61*a*, 61*b* are time synchronised with each other and with the video images of the received camera feed 21. The detector signals 61 are preferably digital, or are digitized by analogue-digital conversion, thereby representing the field of view as an array of pixel values. As noted above, in the example embodiments the detector signals 61 are based on infra-red wavelengths and thus represent an intensity of the selected infra-red wavelengths at each pixel value.

The mask signal generating unit 46 generates a mask signal 43 to be applied to the video images 71. The mask signal 43 is suitably derived from and is based on the detector signals 61*a*, 61*b*. In particular, the mask signal 43 can be obtained with reference to the difference between the pixel values of the first and second detector signals 61a, 61b. The difference value can be compared against a threshold. That is, when the difference is greater than a threshold then the relevant pixel or group of pixels are determined to be within the target area 75 (shown in black), whereas when the difference is less than the threshold then the relevant pixels or not part of the target area (i.e. a non-target area 76 shown in white for illustration). Notably, there is an enhanced contrast between the first and second detector signals 61a, 61b in the region of interest relating to the subject 10, which allows the position or target area of the subject billboard 10 within the image field to be established with a high degree of certainty and accuracy. As a result, the mask signal 43 produced by the content replacement apparatus 40 accurately defines the desired masking area (target area) 75, even if the subject billboard 10 is partially obscured by an intervening object 12.

The masking area signal 43 is itself a useful product of the system and can be output or recorded in a durable storage unit 48 to be used later. In one example embodiment, the content replacement apparatus 40 may be used only to produce the masking area signal 43, and the content substitution operation may be performed downstream by another piece of equipment. For example, looking again at FIG. 1, the masking area signal 43 may be transmitted to the broadcasting system 50 to be carried alongside the broadcast feed to a downstream content substitution unit 47 (remote adder) to insert the alternate content 42 locally prior to transmission by a local transmitter unit 51.

In the example embodiments, the content substitution unit 47 electronically substitutes the target area with the alternate content 42 to produce the respective alternate feed 41. In the illustrated embodiment, the content substitution unit 47 electronically substitutes one or more of the target areas within the video images 21 with the alternate image content 42 according to the masking signal 43. Thus, the content substitution unit 47 in use produces the respective alternate video image feed 72.

Figure 8:
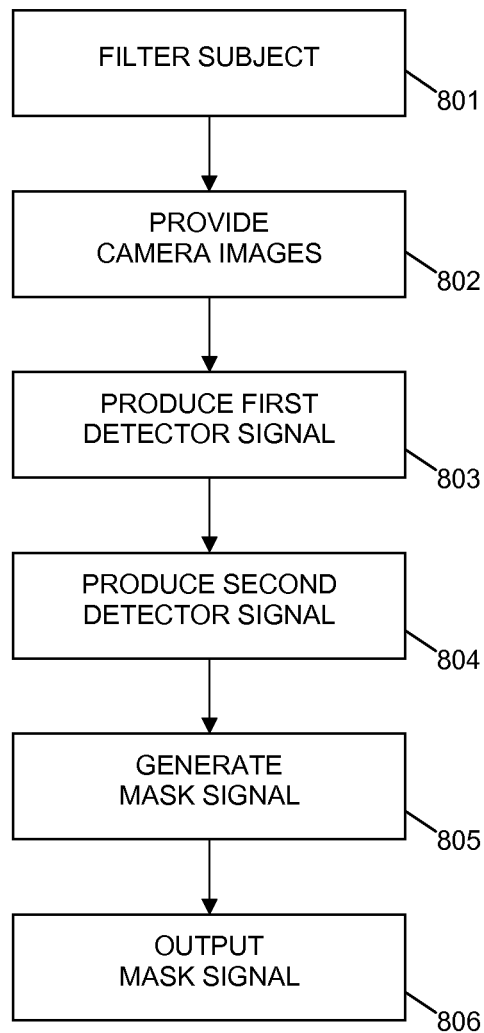
FIG. 8 is a schematic flow diagram of an example content detection method.

FIG. 8 is a schematic flow diagram illustrating an example method of content detection. Step 801 includes filtering radiation from a subject to absorb radiation only in a selected first wavelength band. Step 802 includes providing camera images of a scene which includes the subject. Step 803 comprises producing a first detector signal observing the scene in the first wavelength band, wherein the radiation from the subject has been filtered to absorb the selected first wavelength band. Step 804 includes producing a second detector signal observing the scene in a second wavelength band, wherein the second wavelength band does not overlap with the first wavelength band and the subject has not been filtered to absorb the second wavelength band. Step 805 comprises generating a mask signal that defines target areas of the camera images corresponding to the subject according to areas of contrast between the first detector signal and the second detector signal. Step 806 comprises outputting the mask signal, e.g. onto the storage medium 48 as a non-transient tangible recording medium. The mask signal 43 is a set of data representing the position of the target area or target areas 75 within the video images 71. Thus, the mask signal 43 can also be considered as target area determining data.

Example embodiments of the method and apparatus as described herein have been found to operate internally or externally in a wide variety of temperature conditions, from freezing cold to hot sunshine, and even with atmospheric interference such as water splashes, fog, rain or snow. It has been found that comparing the first and second detector signals surprisingly improves the ability of the content replacement system to make a reliable and efficient determination of the masking area signal, e.g. corresponding to a billboard, even in adverse and challenging practical environments. Hence, dynamic content replacement is performed quickly and reliably, suitable even for live transmissions.

The industrial application of the example embodiments will be clear from the discussion herein.

At least some embodiments may be constructed, partially or wholly, using dedicated special-purpose hardware. Terms such as 'component', 'module' or 'unit' used herein may include, but are not limited to, a hardware device, such as a Field Programmable Gate Array (FPGA) or Application Specific Integrated Circuit (ASIC), which performs certain tasks. Alternatively, elements of the invention may be configured to reside on an addressable hardware storage medium and be configured to execute on one or more processors. Thus, functional elements of the invention may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Further, although the example embodiments have been described with reference to the components, modules and units discussed herein, such functional elements may be combined into fewer elements or separated into additional elements.

Although a few example embodiments have been shown and described, it will be appreciated by those skilled in the art that various changes and modifications might be made without departing from the scope of the invention, as defined in the appended claims.

The invention claimed is:

1. An image content replacement system, comprising:
   at least one detector unit which observes a scene including a subject to provide a first detector signal relating to a first wavelength band and a second detector signal relating to a second wavelength band which is distinct from the first wavelength band; and
   a content replacement unit which generates a mask signal based on both the first detector signal and the second detector signal, the mask signal being derived from regions of contrast between the first and second detector signals, the mask signal identifying one or more target areas within video images observing the subject for replacement with alternate content;
   wherein the first wavelength band and the second wavelength band both comprise non-visible wavelengths.

2. The system of claim 1, wherein the content replacement unit comprises:
   a video image receiving unit which receives the video images observing the subject;
   a detector signal processing unit which processes the first and second detector signals, wherein the first detector signal observes the scene in the first wavelength band and the second detector signal observes the scene in the second wavelength band; and
   a mask signal generating unit which generates and outputs the mask signal that defines the target areas of the video images corresponding to the subject based on both the first detector signal and the second detector signal.

3. The system of claim 1, wherein the subject substantially transmits, emits or reflects the second wavelength band.

4. The system of claim 1, wherein the first wavelength band and the second wavelength band are mutually exclusive.

5. The system of claim 1, wherein the first wavelength band and the second wavelength band are separated by an inter-band gap.

6. The system of claim 1, wherein the first wavelength band is closer to a visible wavelength band than the second wavelength band.

7. The system of claim 1, wherein the first wavelength band and the second wavelength band are both infra-red wavelength bands.

8. The system of claim 2, wherein:
the video image receiving unit is arranged to receive the video images which observe the scene including both the subject and an intervening object which at least partially obscures the subject, and
the mask signal generating unit is arranged to generate and output the mask signal distinguishing between the subject and the intervening object based on both the first detector signal and the second detector signal.

9. The system of claim 1, further comprising a content substitution unit which substitutes one or more of the target areas in the video images with alternate content according to the mask signal to output modified video images.

10. A billboard adapted for use with an image content replacement system that is configured to detect absorption of radiation in a first wavelength band and in a second wavelength band, said billboard comprising:
a substrate for carrying a printed medium having a printed image; and
a filtering medium or film which specifically absorbs the first wavelength band at least over an area of the billboard occupied by the printed image;
wherein the first wavelength band and the second wavelength band both comprise non-visible wavelengths.

11. An image content detection apparatus, comprising:
a video image receiving unit which receives video images observing a scene including a subject;
a detector signal processing unit which processes a plurality of detector signals relating to the scene including the subject, wherein a first detector signal observes the scene in a first wavelength band and wherein a second detector signal observes the scene in a second wavelength band; and
a mask signal generating unit which generates and outputs a mask signal that defines target areas of the video images corresponding to the subject, the mask signal being generated using both the first detector signal and the second detector signal according to regions of contrast between the first detector signal and the second detector signal;
wherein the first wavelength band and the second wavelength band both comprise non-visible wavelengths.

12. A method of detecting a subject in video images, the method comprising:
providing video images of a scene which includes the subject;
producing a first detector signal observing the scene in a first wavelength band;
producing a second detector signal observing the scene in a second wavelength band different from the first wavelength band;
generating a mask signal that defines a target area of the video images corresponding to the subject using both the first detector signal and the second detector signal, the mask signal being derived according to regions of contrast between the first detector signal and the second detector signal; and
outputting the mask signal;
wherein the first wavelength band and the second wavelength band both comprise non-visible wavelengths.

13. The method of claim 12, further comprising substituting the target area in the video images with alternate image content according to the mask signal.

14. A non-transitory computer readable medium having recorded thereon computer program instructions which, when executed by a processor of a content replacement apparatus that is configured to receive video images of a scene that includes a subject that absorbs radiation at least in a selected first wavelength band and to receive a first detector signal observing the scene in the first wavelength band and a second detector signal observing the scene in a second wavelength band different from the first wavelength band, configures the content replacement apparatus to:
generate a mask signal that defines a target area of the video images corresponding to the subject, the mask signal being based on both the first detector signal and the second detector signal, the mask signal being generated according to regions of contrast between the first detector signal and the second detector signal; and
output the mask signal for application to the video images;
wherein the first wavelength band and the second wavelength band both comprise non-visible wavelengths.

15. The billboard of claim 10, wherein the billboard comprises one or more compensating light emitting devices which are arranged to emit visible light of selected wavelengths to correct for chromatic deficiencies in a visible appearance of the billboard.

16. A method of detecting image content, comprising:
receiving video images of a scene that includes a subject;
receiving a first detector signal observing the scene in a first wavelength band;
receiving a second detector signal observing the scene in a second wavelength band different from the first wavelength band;
generating a mask signal that defines a target area of the video images corresponding to the subject, the mask signal being generated using both the first detector signal and the second detector signal according to regions of contrast between the first detector signal and the second detector signal; and
outputting the mask signal for application to the video images;
wherein the first wavelength band and the second wavelength band both comprise non-visible wavelengths.

17. The system of claim 1, wherein the subject actively emits radiation in the second wavelength band.

18. The system of claim 1, wherein the subject is an actively illuminated billboard which is constructed to absorb radiation in the first wavelength band and comprises elements that emit radiation at least in the second wavelength band.

19. The system of claim 1, wherein the subject absorbs radiation specifically in the first wavelength band.

* * * * *